US008939214B2

(12) United States Patent
Litherland et al.

(10) Patent No.: US 8,939,214 B2
(45) Date of Patent: Jan. 27, 2015

(54) RISER CONNECTOR (75) Inventors: Shaun Hugh Litherland, Blackburn Lancashire (GB); Paul Anthony Hughes, Lancaster (GB)

(73) Assignee: First Subsea Limited, Lancaster (GB)

( * ) Notice: Subject to any disclaimer, the term of this patent is extended or adjusted under 35 U.S.C. 154(b) by 770 days.

(21) Appl. No.: 13/063,641

(22) PCT Filed: Aug. 19, 2009

(86) PCT No.: PCT/GB2009/051035
§ 371 (c)(1),
(2), (4) Date: Mar. 22, 2012

(87) PCT Pub. No.: WO2010/029322
PCT Pub. Date: Mar. 18, 2010

(65) Prior Publication Data
US 2012/0168172 A1    Jul. 5, 2012

(30) Foreign Application Priority Data

Sep. 11, 2008   (GB) .................................... 0816610.0

(51) Int. Cl.
*E21B 43/01*        (2006.01)
*E21B 17/01*        (2006.01)
(Continued)

(52) U.S. Cl.
CPC ............. *E21B 19/004* (2013.01); *E21B 17/015* (2013.01); *E21B 17/017* (2013.01); *E21B 43/0107* (2013.01); *E21B 43/0135* (2013.01); *F16L 1/15* (2013.01); *F16L 1/20* (2013.01)
USPC ............................ 166/343; 166/346; 166/367

(58) Field of Classification Search
CPC .. E21B 17/015; E21B 17/017; E21B 43/0107
USPC ............... 166/343, 346, 352, 367; 405/168.1, 405/168.2, 224.3; 403/DIG. 3, DIG. 4; 285/34, 35, 307, 314
See application file for complete search history.

(56) References Cited

U.S. PATENT DOCUMENTS 2,628,111 A * 2/1953 Smalline .................... 285/310
3,002,565 A * 10/1961 Moore, Jr. .................. 166/217
(Continued)

FOREIGN PATENT DOCUMENTS

EP     0156575 A2    10/1985
GB     2033463 A  *   5/1980
(Continued)

OTHER PUBLICATIONS

International Preliminary Report on Patentability and Written Opinion, dated May 31, 2011, received from the International Bureau of WIPO.
(Continued)

*Primary Examiner* — Matthew Buck
*Assistant Examiner* — Stacy Warren
(74) *Attorney, Agent, or Firm* — Meunier Carlin & Curfman, LLC (57) ABSTRACT Various implementations include a system for introducing upwardly a flexible member into a tubular fixed structure with a sleeve surrounding the flexible member in the region where the flexible member attaches to the tubular fixed structure. The system allows for the flexible member to be drawn upwardly into a bore of the tubular fixed structure. In one implementation, a plurality of locking dogs are attached to and are radially moveable with respect to the sleeve between an inner locking position in which they engage with the flexible member, and an outer release position in which they are disengaged from the flexible member. In addition, a latch ring is disposed on a substantially cylindrical surface so that it may be deflected axially along said surface on contact between the sleeve and tubular fixed structure to permit release of the locking dogs.

17 Claims, 12 Drawing Sheets (51) Int. Cl.
  *E21B 19/00* (2006.01)
  *E21B 43/013* (2006.01)
  *F16L 1/15* (2006.01)
  *F16L 1/20* (2006.01)

(56) References Cited

U.S. PATENT DOCUMENTS

| | | | | |
|---|---|---|---|---|
| 3,987,741 | A | * | 10/1976 | Tryon .......................... 114/322 |
| 4,086,776 | A | * | 5/1978 | Beard .......................... 405/185 |
| 4,443,130 | A | * | 4/1984 | Hall .............................. 405/190 |
| 5,437,518 | A | | 8/1995 | Maloberti et al. |
| 5,484,222 | A | | 1/1996 | Schulze-Beckinghausen |
| 5,947,642 | A | * | 9/1999 | Teixeira et al. ............ 405/195.1 |
| 6,536,527 | B2 | * | 3/2003 | Munk et al. .................. 166/345 |
| 2002/0009336 | A1 | | 1/2002 | Munk et al. |

FOREIGN PATENT DOCUMENTS

| | | |
|---|---|---|
| GB | 2334054 A | 8/1999 |
| GB | 2424684 A | 10/2006 |
| GB | 2427452 A | 12/2006 |
| WO | WO 2005095198 A1 * | 10/2005 |
| WO | WO 2006112730 A1 * | 10/2006 |
| WO | 2007127737 A2 | 11/2007 |
| WO | 2008008877 A2 | 1/2008 |
| WO | 2010029322 A3 | 3/2010 |

OTHER PUBLICATIONS

International Search Report, dated May 24, 2011, received from the European Patent Office.

* cited by examiner

RISER CONNECTOR

This invention concerns a system for connecting a flexible member such as a flexible sub-sea riser or umbilical to a tubular fixed structure either at or beneath the surface.

In sub-sea operations it is often required to connect a flexible riser or umbilical between a device operating on the sea bed and a vessel or fixed surface platform. Such a riser or umbilical may include cabling and control supply to the devices on the sea bed to enable them to be operated remotely from the surface structure, or may provide the import and export of production fluids and gases to and from the surface.

Thus, the riser or umbilical (hereinafter referred to generally as "a riser") when connected to the submerged device, needs to be drawn up for connection to a tubular fixed structure at the surface and to have a bend stiffener where it joins the fixed structure to protect the riser from the effects of currents and movements causing the riser to bend and thus become fatigued about its connection to the fixed structure. When drawing the riser into the fixed structure it is necessary to locate and attach the upper end of the bend stiffener with respect to the structure. This is often done conventionally by using a sub-sea remote operated vehicle (ROV) to clamp and unclamp the bend stiffener with respect to the riser, thus allowing the riser to be drawn fully up into position once the bend stiffener is in place. It is an object of the present invention to provide a system of this kind which does not require the use of an ROV or any external clamping arrangement to maintain the bend stiffener and riser in a fixed disposition during installation, and then to support the bend stiffener to allow the riser to be drawn fully into position.

GB-A-2427452 (Aker) describes a riser connector having a bend stiffener connected to a riser terminal by shear bolts. When the head is drawn into the cylindrical receptor, fingers snap into an annular flange to lock the bend stiffener in the tubular receptor. When extra load is applied to the hauling device, the shear bolts snap and the riser can continue its elevation. When the terminal is to be released, the riser is lowered so that a coned collar engages the fingers, squeezing them together so that the bend stiffener can be released. Beforehand, a retention device must be applied which hooks underneath a flange of the bend stiffener so that, when the riser and bend stiffener are finally released, the bend stiffener is prevented from sliding down the riser.

GB-A-2334054 (Petroleo) describes a similar system where shear bolts (screws) are employed to connect a bend stiffener to a terminal end of the riser. Fingers prevent pawls from pivoting to permit entry of the bend stiffener into a receptor. Rotation of a collar by a diver permits the pivoting. Later, release of the bend stiffener must be effected by screwing the collar so that coned flanges expand the pawls to their release position.

According to a first aspect of the present invention there is provided a system for introducing upwardly a flexible member into a tubular fixed structure with a sleeve surrounding the flexible member in the region where the flexible member attaches to the tubular fixed structure;

the system comprising means for enabling the flexible member to be drawn upwardly into a bore of the tubular fixed structure, said bore being defined by an inner surface of said tubular structure, clamping means on the sleeve temporarily clamping the sleeve and flexible member together, and release means on the sleeve adapted to automatically release the clamping means when the sleeve attains a fixed disposition with respect to the tubular fixed structure, such as to permit continued movement of the flexible member with respect to the sleeve, wherein said clamping means comprise a plurality of locking dogs attached to and radially moveable with respect to the sleeve between an inner locking position in which they engage with the flexible member, and an outer release position in which they are disengaged from the flexible member; and wherein said release means comprises a latch ring disposed on a substantially cylindrical surface so that it may be deflected axially along said surface on contact between the sleeve and tubular fixed structure to permit release of said locking dogs.

The term "upwardly" is with reference to gravity and refers to the general orientation with respect to gravity of the components defined when in normal use. "Fixed structure" means "relatively fixed" and may comprise a floating vessel.

Preferably, in said inner locking position, the locking dogs are engaged with a slot in said flexible member so that the locking dogs are in axial alignment with a portion of the flexible member both axially above and below the locking dogs to clamp the sleeve and flexible member together, and in said outer release position the locking dogs are not engaged with the slot so that continued movement of the flexible member with respect to the sleeve is permitted. Said locking dogs are preferably radially biased towards said outer release position.

In said inner locking position, said latch ring is preferably in radial alignment with and circumferentially surrounds said locking dogs to prevent said locking dogs moving radially outwards out of engagement with said slot, and in said outer release position said latch ring is not in radial alignment with said locking dogs so as to allow said locking dogs to move radially outwards out of engagement with said slot.

Preferably, said cylindrical surface comprises an outer surface of the sleeve through which radial apertures are formed to receive said locking dogs, and outer surfaces of said locking dogs.

Said sleeve preferably comprises a main body and a nose cone, said nose cone being axially moveable from an extended position to a compressed position relative to said main body. A rim of said nose cone is preferably in axial alignment with said latch ring so that when said nose cone moves from said extended position to said compressed position said rim abuts said ring and moves it axially out of radial alignment with said locking dogs. Said nose cone is preferably separated from said main body by a plurality of springs, said plurality of springs also biasing said nose cone to said extended position.

Said tubular fixed structure preferably comprises a shoulder portion projecting radially inward from said inner surface of said tubular fixed structure, said shoulder portion having a smallest diameter that is less than a largest diameter of said nose cone and greater than a largest diameter of said flexible member. Thus, the shoulder portion is preferably sized to allow passage of the flexible member but not the sleeve. In a particularly preferably embodiment, said shoulder portion has a conical profile that is complementary to a top portion of said nose cone. The complementary profiles assist the nose cone in locating and forming a good fit with the shoulder portion.

Said sleeve preferably comprises a plurality of ramped surfaces thereon, a tubular cage surrounding said sleeve, a plurality of rolling members each captively retained within apertures of the tubular cage, said tubular cage being axially moveable and biased axially upwardly with respect to the sleeve, said rolling members being capable of gripping said tubular fixed structure by wedging between said ramped surfaces and said inner surface of said tubular fixed structure. Said inner surface of said tubular fixed structure preferably comprises circumferential grooves having a ramped profile in an axial cross section whereby the inclination of the ramped grooves is such that said rolling members are able to move axially up the grooves but are inhibited from moving axially downwards beyond said grooves. In a particularly preferable embodiment, said rolling members are balls. The tubular cage is preferably biased axially upwardly with respect to said sleeve by springs attached to said tubular cage and said sleeve.

In an alternative preferable embodiment, the sleeve is supported on the tubular fixed structure by the clamping means upon said release of the clamping means. Preferably, an internal wall formation of the tubular structure thereof abuts said latch ring on upward movement of the sleeve relative to said tubular structure and moves it axially out of radial alignment with said locking dogs causing the locking dogs to be maintained in their locking positions until the sleeve moves to a position in which the dogs are released above said wall formation which thus supports the locking dogs and the sleeve in the tubular fixed structure. The tubular fixed structure preferably includes further release means to re-position the locking dogs in their locking position thus to clamp the sleeve and flexible member together for release of the sleeve and flexible member from the tubular fixed structure. The further release means preferably comprises a collar slidably located within the tubular fixed structure and engageable with the clamping means to move same into engagement with the flexible member. The latch ring is preferably connected to said locking dogs by at least one shear pin and said at least one shear pin must be sheared so that said latch ring may be deflected axially along said surface on contact between the sleeve and tubular fixed structure to permit release of said locking dogs.

Preferably said sleeve is provided with sealing means located both axially above and axially below said rolling members to define a sealed annulus between said tubular fixed structure and said sleeve when said sleeve is disposed within said tubular fixed structure, wherein said rolling members are contained within said sealed annulus. Further preferably, said sealing means comprise a plurality of o-ring seals each disposed in an annular groove in said sleeve. The sealing means therefore protect the rolling member from degrading and minimise the risk of failure. This is particularly important since the rolling members are critical in retaining the sleeve within the tubular fixed structure.

In a second aspect of the present invention, there is provided a system for upwardly introducing a flexible member into a tubular fixed structure with a sleeve surrounding the flexible member in the region where the flexible member attaches to the tubular fixed structure, the system comprising means for enabling the flexible member to be drawn upwardly into the tubular fixed structure, clamping means on the sleeve temporarily clamping the sleeve and flexible member together, and release means on the sleeve adapted automatically to release the clamping means when the sleeve attains a fixed disposition with respect to the tubular fixed structure such that the sleeve is then supported on the tubular fixed structure by the clamping means, and such as to permit continued movement of the flexible member with respect to the supported sleeve.

The clamping means preferably comprises at least one locking dog attached to and moveable with respect to the sleeve between an inner locking position in which it engages with the flexible member, and an outer release position in which it is disengaged from the flexible member but supported with the sleeve on the tubular fixed structure. Preferably, the or each locking dog is spring biased towards its release position. The or each locking dog is preferably temporarily retained in its locking position by a latch ring surrounding a part of the sleeve, means being provided on the tubular fixed structure to cause the latch ring to release the or each locking dog from its locking position.

Preferably, in said locking position, said latch ring is connected to the or each locking dogs by at least one shear pin, said means provided on the tubular fixed structure to cause the latch ring to release the or each dog from its locking position also causes said at least on shear pin to be sheared. The system preferably includes a plurality of said locking dogs spaced apart around the sleeve on a male part thereof adapted to become engaged within a female part of the tubular fixed structure, an internal wall formation thereof causing the locking dogs to be maintained in their locking positions until said male and female parts are fully engaged, and to support the released locking dogs at full engagement thus to support the sleeve on the tubular fixed structure.

The tubular fixed structure preferably includes further release means to re-position the or each locking dog in its locking position thus to clamp the sleeve and flexible member together for release of the sleeve and flexible member from the tubular fixed structure. Preferably, the further release means comprises a collar slidably located within the tubular fixed structure and engageable with the clamping means to move same into engagement with the flexible member.

In both first and second aspects of the present invention, the sleeve is preferably a bend stiffener and the flexible member is preferably a flexible sub-sea riser.

According to a third aspect of the present invention, there is provided a system for holding a tubular body within a female tubular receptacle, said tubular body comprising a plurality of ramped surfaces thereon, a tubular cage surrounding said tubular body, and a plurality of rolling members each captively retained within apertures of the tubular cage, where said tubular cage is axially moveable and biased axially upwardly with respect to the tubular body, and said rolling members are capable of gripping said female tubular receptacle by wedging between said ramped surfaces and an inner surface of said female tubular receptacle, wherein said inner surface of said female tubular receptacle comprises circumferential grooves having a ramped profile in an axial cross section whereby the inclination of the ramped grooves is such that said rolling members are able to move axially up the grooves but are inhibited from moving axially downwards beyond said grooves. Preferably, said rolling members are balls and said tubular cage is preferably biased axially upwardly with respect to said bend stiffener by springs attached to said tubular cage and said bend stiffener.

Embodiments of the invention will now be described, by way of example only, with reference to the accompanying drawings, in which.

Figure 1:
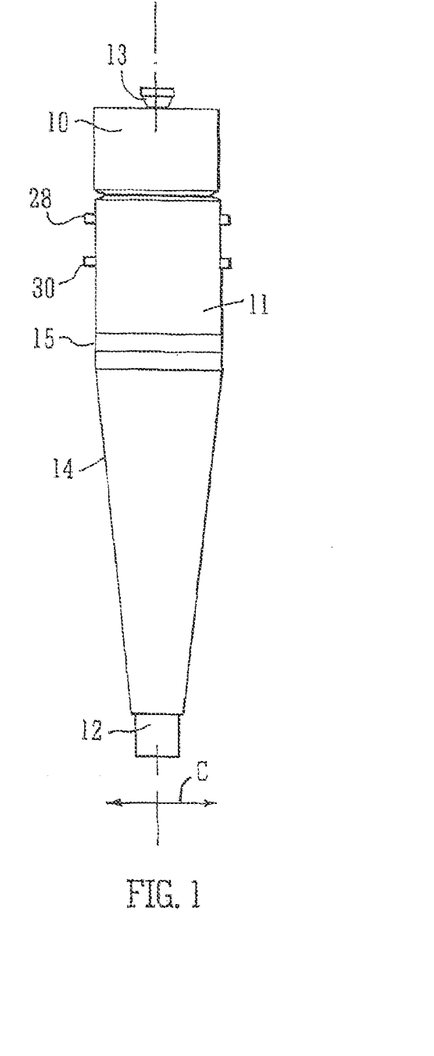
FIG. 1 illustrates a vertically disposed riser and bend stiffener connected to a tubular fixed structure thus permitting the riser relative vertical movement with respect to the bend stiffener.

Referring now to the drawings, there is shown in FIG. 1 a tubular fixed structure 10 often referred to as an I-tube or J-tube. Attached to and forming part of the lower open end of the tubular fixed structure 10 is a tubular female receptor 11. A riser 12 at the upper end of which is a member 13 to which a pull-in cable is attached is shown introduced into the tubular fixed structure 10, and surrounding the riser 12 is a bend stiffener 14 usually of tapering form which has, at its upper end, a male part 15 which, as will be seen, fits closely into the female receptor 11 thus to protect the riser 12 from the effects of bending due to continuously changing currents as illustrated by arrow C around the point of connection of the riser to the fixed structure. This also protects the riser from the effects of overboarding from the surface and additional damage that may be caused during installation.

There will now be described in further detail a system for introducing the riser and bend stiffener into the tubular fixed structure including means to maintain the riser and bend stiffener in fixed relationship until the bend stiffener is locked into position within the female receptor 11. Thus there is avoided the need for clamping the riser at the lower end of the bend stiffener, which clamp would otherwise need to be removed using an ROV after installation. The system is entirely contained within the female receptor 11 and engages automatically as the bend stiffener is introduced. Thereafter, it is possible to continue pulling in the riser relative to the bend stiffener as required to connect the riser at its upper end.

Figure 2:
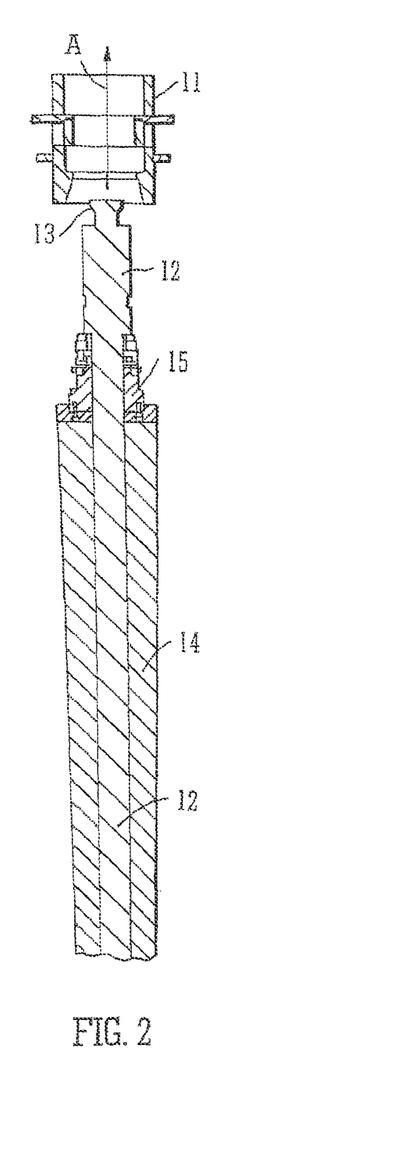
FIG. 2 is a cross-sectional view of a riser and bend stiffener prior to introduction into a tubular fixed structure.

FIG. 2 shows in cross-section a riser and bend stiffener clamped together and being introduced into the female receptor 11 in the direction of the arrow A. It is to be assumed that a pull-in wire is connected to the member 13 at the top of the riser for this purpose.

Figure 3:
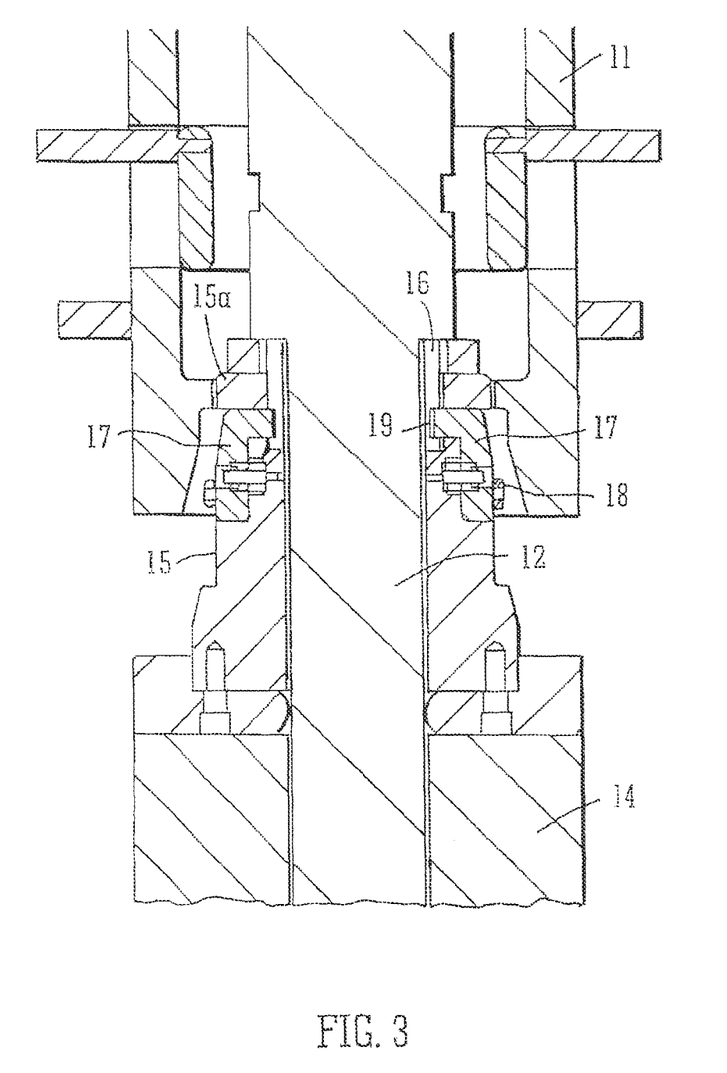
FIG. 3 is an enlarged cross-sectional view of the riser and bend stiffener in an initial stage of introduction into the tubular fixed structure.

Referring now to FIG. 3, there is shown a pull-in adaptor 16 which is attached to the riser 12. Alternatively, the adaptor 16 and riser 12 may be integrally formed as one piece.

The male part 15 of the bend stiffener 14 carries, near its upper end, a plurality of spaced apart, inverted L-shaped locking dogs 17 which are spring biased outwardly, as will be described in further detail in relation to FIG. 4, but as shown in FIG. 3 are maintained by a circumferential pull-in collar 18 such that the upper inner ends of the locking dogs 17 engage within a circumferential groove 19 in the pull-in adaptor 16 thus to lock together the male part 15 of the bend stiffener 14 and the riser 12. In this manner, the riser and bend stiffener can be manoeuvred into place together. An outwardly extending chamfered upper end part 15a of the male part 15 ensures correct alignment as the bend stiffener enters the receptor 11.

In the alternative case where the adapter 16 and riser 12 are integrally formed, then a circumferential groove would be machined directly into the riser 12 or member 13.

Figure 4:
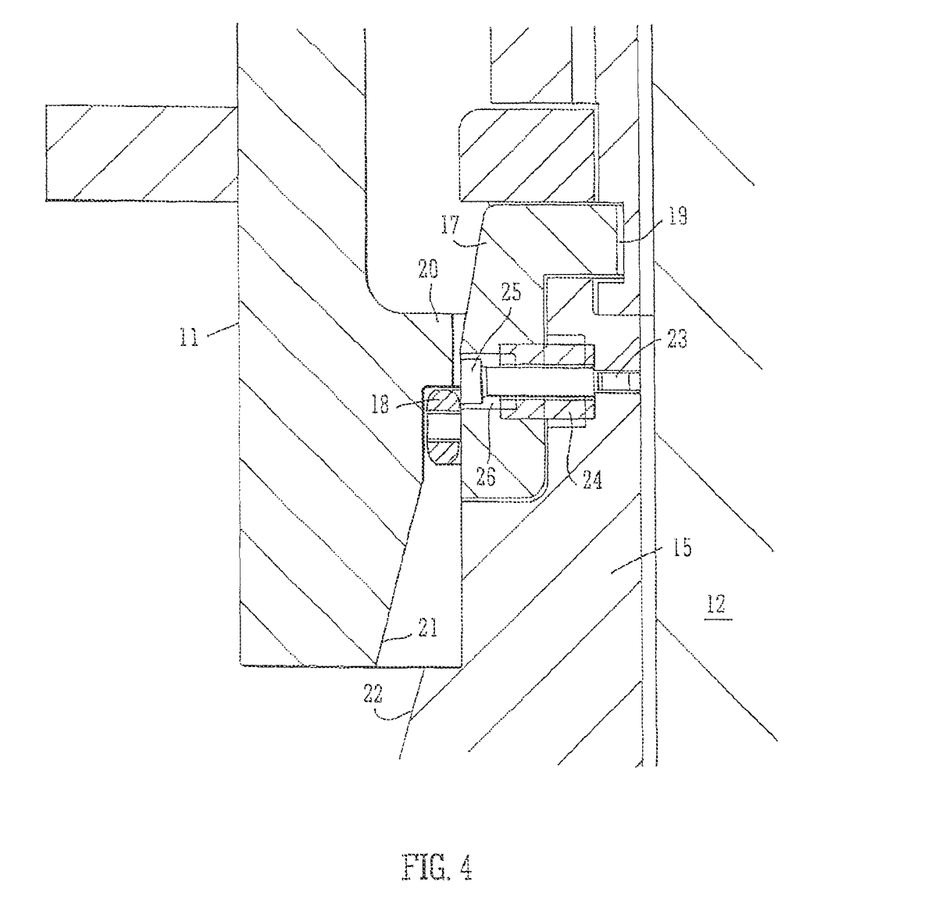
FIG. 4 is a further enlarged cross-section showing a further stage of introduction.
Figure 5:
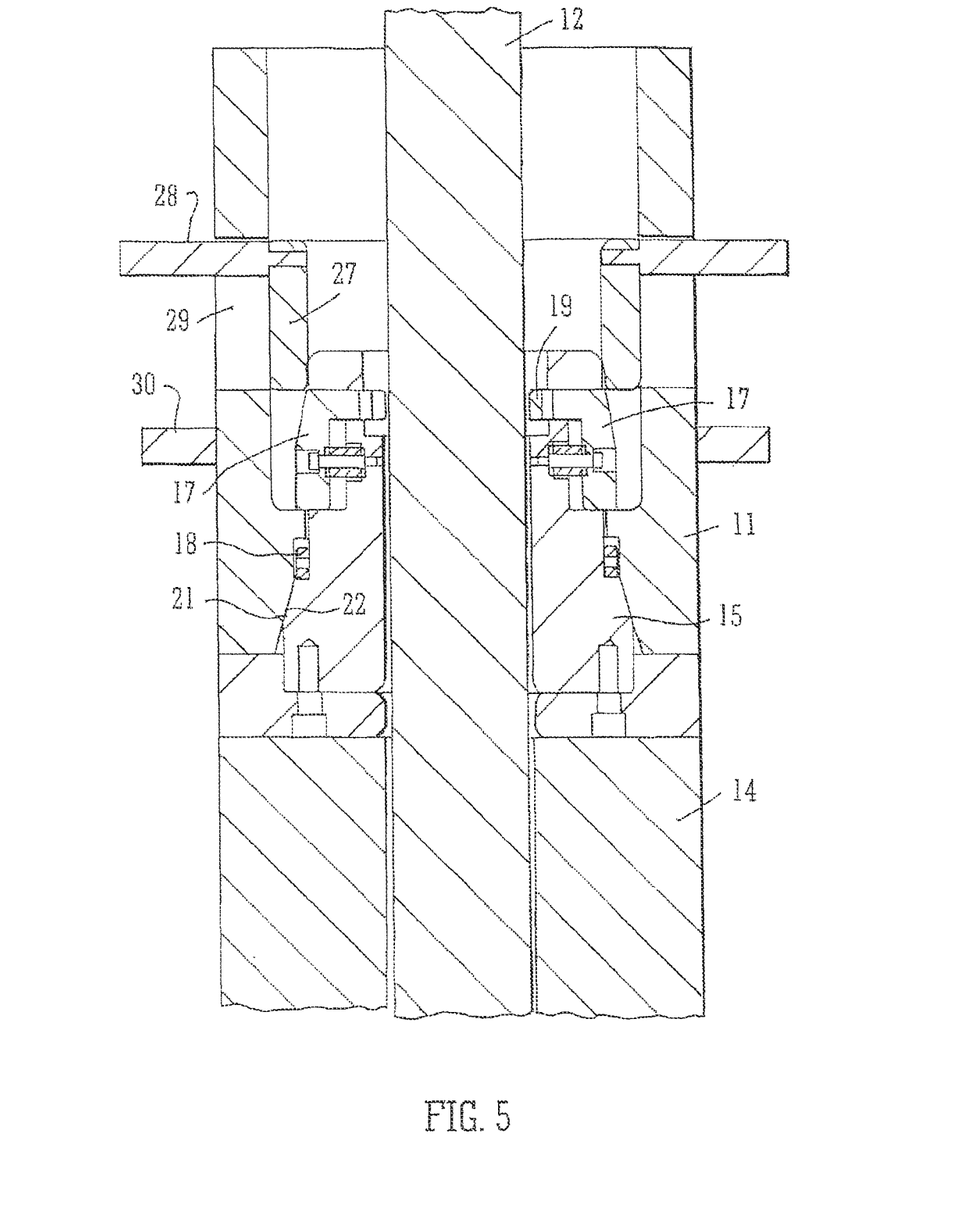
FIG. 5 illustrates the final stage of introduction.

Referring now to FIG. 4, as the assembly continues to rise into the female receptor 11, the pull-in collar 18 engages the underside of an inwardly projecting lip 20 formed on the internal wall of the tubular female receptor 11 so that further upward movement of the assembly causes the pull-in collar 18 to slide downwardly with respect to the locking dogs 17 until such time as mutually tapered surfaces 21 and 22 of the female receptor 11 and the male part 15 respectively, come into engagement one with the other. This position is illustrated in FIG. 5, at which point the lower extremity of each locking dog 17 has risen above the lip 20 of the female receptor 11 so that the locking dogs 17 are free to move outwardly under the influence of springs 23 to take up the positions illustrated in FIG. 5. In this position, the locking dogs 17 and the remainder of the bend stiffener assembly attached to them are supported on the lip 20 so that the entire bend stiffener assembly is locked into position with respect to the female receptor 11, at which point the riser 12 is free to continue to rise into the I-tube 10 to be connected at its upper end to the fixed structure.

It will be appreciated, therefore, that the bend stiffener assembly automatically becomes supported with respect to the fixed structure without the need for any external means to release the riser 12.

The springs 23 are preferably associated with resilient bushes 24 which serve to push the locking dogs outwardly once released above the lip 20. Stop pins 25 contained within recesses 26 in the locking dogs 17 serve to limit the outward movement of the locking dogs relative to the male part 15 of the bend stiffener.

Further located within the female receptor 11 of the fixed structure is a release collar 27 having an actuator arm 28 projecting outwardly through a slot 29 in the wall of the female receptor, and a fixed arm 30 extends outwardly therefrom.

It will be appreciated that the entire installation process is carried out without the need for external means, the entire clamping and subsequent release and support of the bend stiffener being carried out automatically by means contained within the tubular fixed structure.

Figure 6:
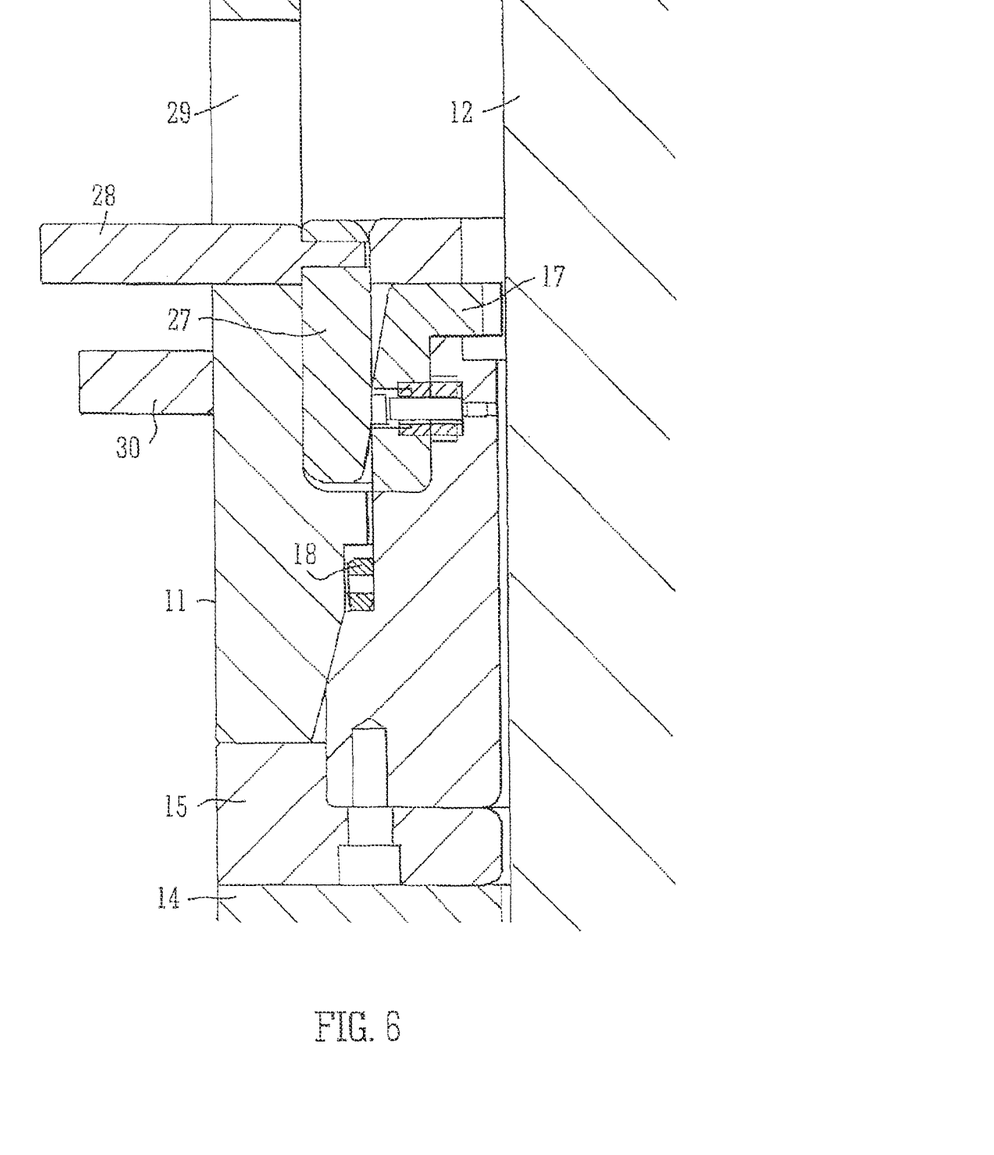
FIG. 6 shows a release mode.
Figure 7:
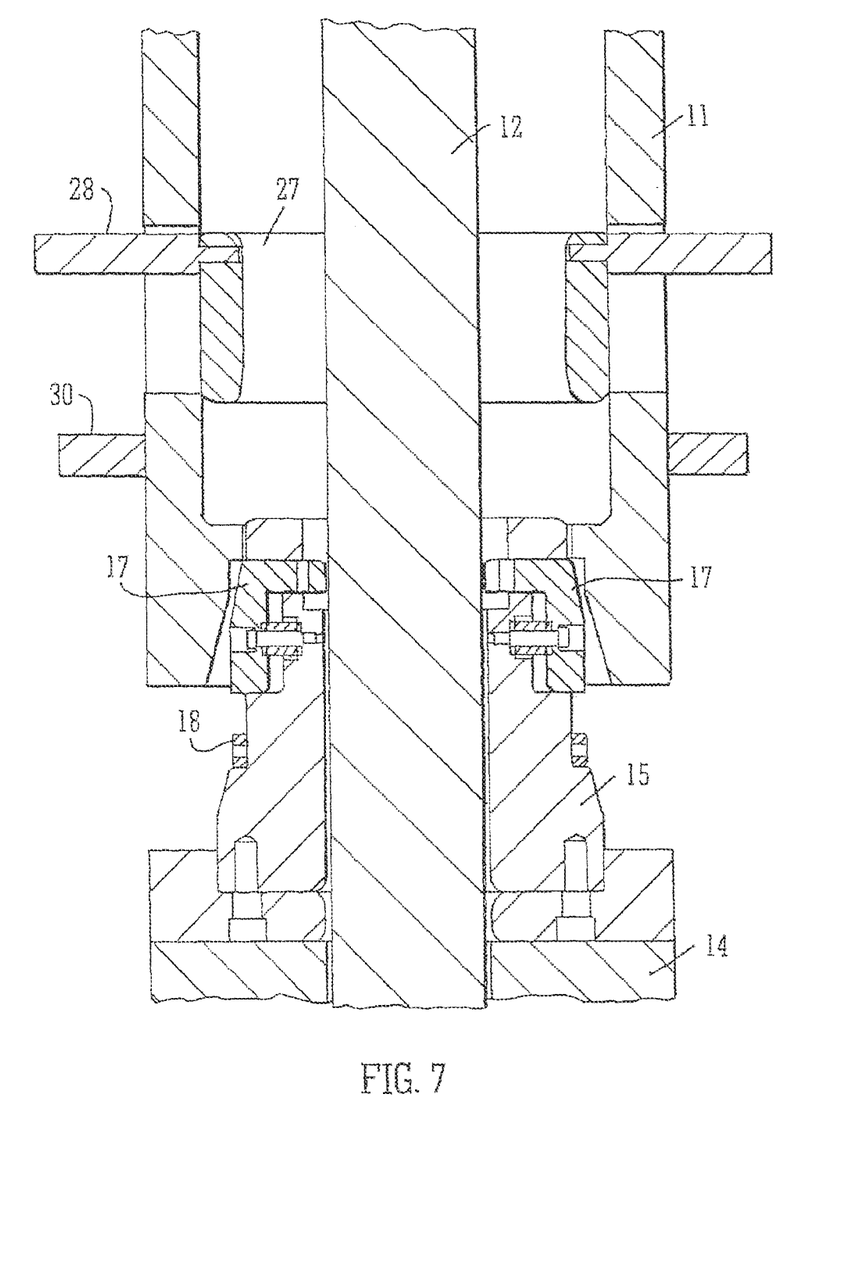
FIG. 7 shows the riser and bend stiffener during release from the tubular fixed structure.

Referring now to FIG. 6, when it is required to release the bend stiffener and riser assembly from the tubular fixed structure, the arms 28 and 30 are clamped together. This may be carried out externally by an ROV and causes the release collar 27 to force the locking dogs 17 inwardly into re-engagement with the pull-in adaptor 16, whereupon the male part 15 and the depressed locking dogs 17 may descend from the female receptor 11, as illustrated in FIG. 7. Again, if necessary, the pull-in collar 18 may be manoeuvred upwardly into engagement with the locking dogs 17 before they become released from the lip 20. However, this invention is principally concerned with introduction of the riser and bend stiffener into the tubular fixed structure without the use of external means. After introduction the need to remove the umbilical from the fixed structure is likely only when the entire operation is completed, in which case any inadvertent detachment of the bend stiffener causing it to descend with respect to the riser is of lesser concern, since the whole assembly of riser and bend stiffener would usually be recovered together with the device at the sea bed using other means. However, if required, the ROV, having been used initially to actuate the release collar 27, may then slide the pull-in collar into place to retain the locking dogs.

As an alternative to an ROV release, an additional hydraulic circuit may be incorporated into the system to enable the male part 15 to be disconnected from the female receptor 11.

An alternative embodiment of the invention is described with reference to FIGS. 8-18C that provides alternative means for separating the bend stiffener from the riser and then connecting the bend stiffener to a tubular fixed structure.

Figure 8:
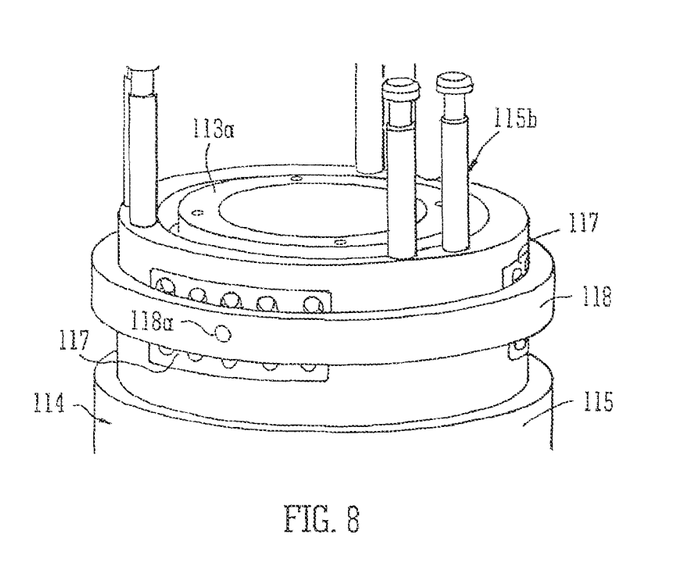
FIG. 8 shows a partial view of the male part of the bend stiffener with the locking dogs held in their locking position by the latch ring.

FIG. 8 shows a partial view of a substantially cylindrical male part 115 of a bend stiffener 114 comprising a plurality of locking dogs 117 circumferentially disposed in radial apertures 115c in the male part 115. As will be described with reference to FIGS. 12-17, disposed within the male part 115 is a pull-in adaptor 113a of a riser 12. The pull-in adaptor 113a is connected to a pull-in head 113 that is used for drawing the riser 112 and bend stiffener 114 into a tubular fixed structure 110.

The locking dogs 117 have a generally T-shaped profile in an axial cross section and are curved where the curvature of the locking dogs 117 is substantially the same as the curvature of the male part 115. The locking dogs 117 comprise an outer plate 117 a and a radially inwardly projecting part 117 b (see FIG. 11). The apertures 115 c are sized to receive the locking dogs 117 entirely so that the outer plates 117 a do not protrude radially outwardly, beyond the outer surface of the male part 115 when disposed therein. The locking dogs 117 are held in the apertures 115 c by springs 117 c that also bias the locking dogs radially outwards.

FIG. 8 shows the plurality of locking dogs 117 in an inner locking position where the radially inwardly projecting parts 117b are engaged with a slot 113b in the pull-in adaptor 113. In the inner locking position, the radially inwardly projecting parts 117b of the locking dogs 117 are in axial alignment, both axially above and below, with a portion of the riser 112 so that the bend stiffener is clamped to the pull-in adaptor. The locking dogs 117 are held in the inner locking position by a latch ring 118 that circumferentially surrounds the locking dogs 117 and the male part 115. In the preferable embodiment shown in the figures, the latch ring 118 is initially joined to each locking dog 117 by a shear pin 118a. The latch ring 118 is arranged on the locking dogs 117 and male part 118 so that it may move axially with respect to the locking dogs 117. In the embodiment where shear pins 118a are employed, the force required to move the latch ring 118 axially with respect to the locking dogs 117 must be greater than the force required to break the shear pins 118a and sever the connection between the latch ring 118 and the locking dogs 117.

Figure 9:
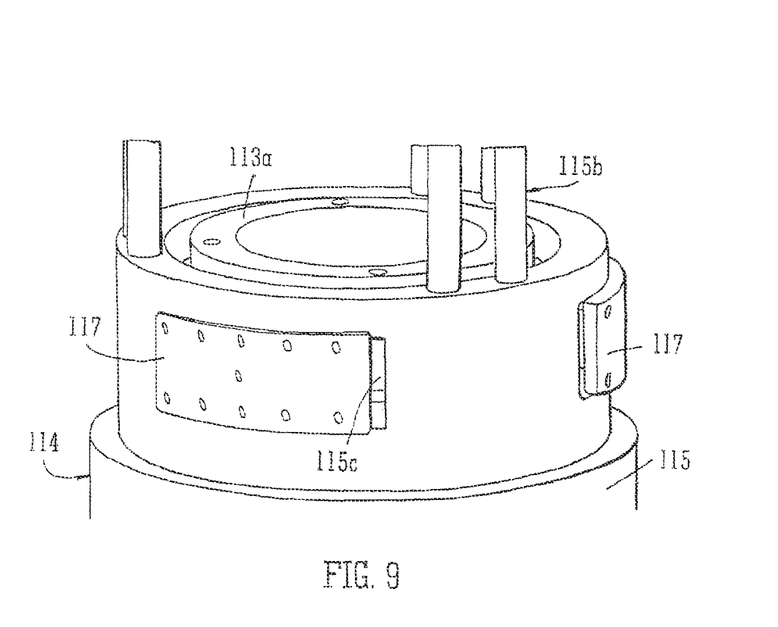
FIG. 9 shows a partial view of the male part of the bend stiffener with the latch ring removed and the locking dogs in their release position.
Figure 10:
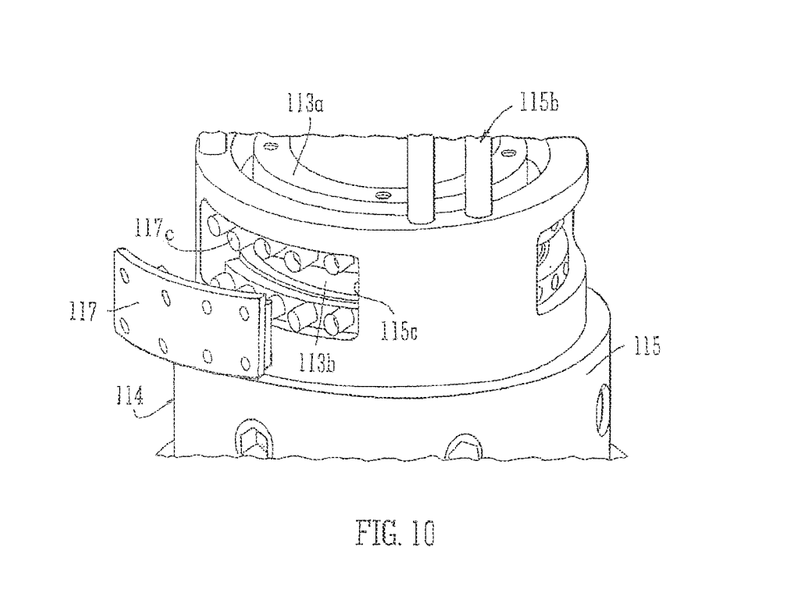
FIG. 10 shows an exploded view of a locking dog relative to the male part.
Figure 11:
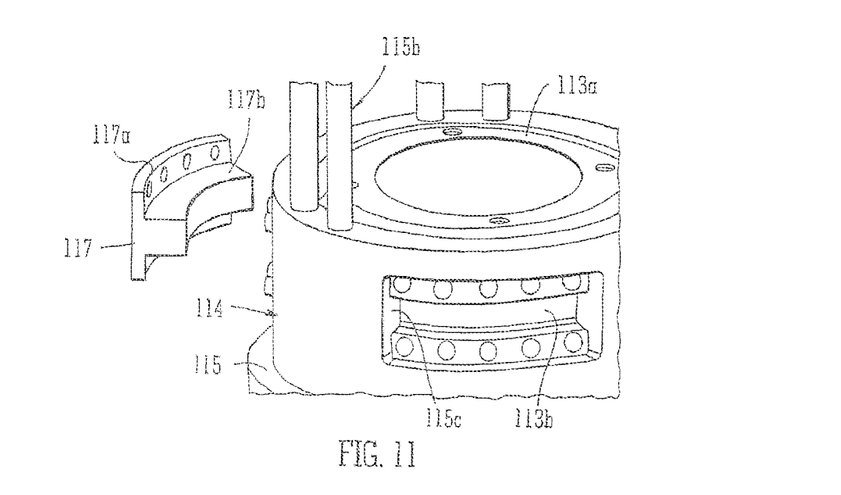
FIG. 11 shows a further view of an exploded view of a locking dog relative to the male part.

FIG. 9 shows the arrangement of FIG. 8 following the removal of the latch ring 118 although the latch ring 118 is not shown for clarity. As shown in FIG. 9, with no latch ring 118 in place, the locking dogs 117 are free to move radially outwards with respect to the apertures 115 c to an outer release position under the influence of springs 117 c. FIGS. 10 and 11 are exploded views of the arrangement of FIG. 9 in which the profile of the locking dogs 117 is more clearly shown. In the release position shown in FIG. 9, the radially inwardly projecting parts 117 b of the locking dogs 117 are no longer engaged with the slot 113 b of the pull-in adaptor 113 a. Therefore, in the release position, the locking dogs 117 do not inhibit movement of the pull-in adaptor (and therefore the riser 112) and the riser 112 is free to move axially with respect to the bend stiffener 114.

Figure 12:
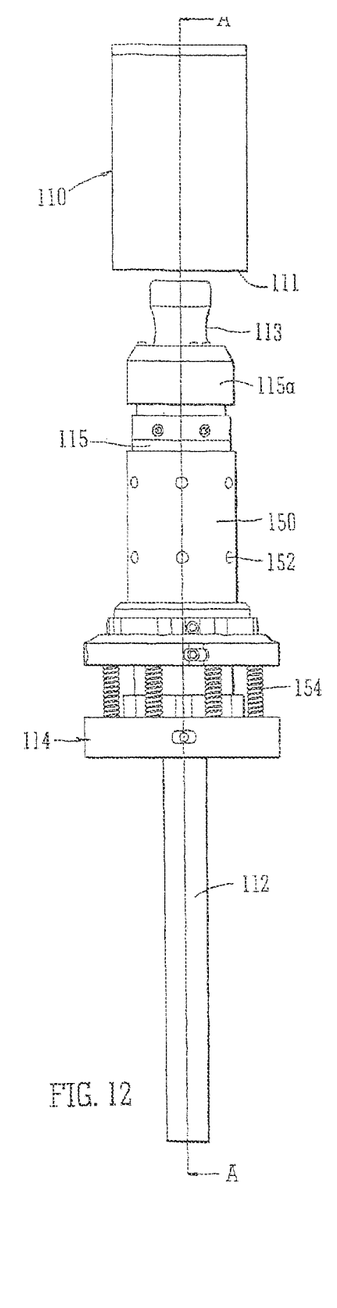
FIG. 12 is a schematic diagram of the riser and bend stiffener prior to insertion in the tubular fixed structure.
Figure 13:
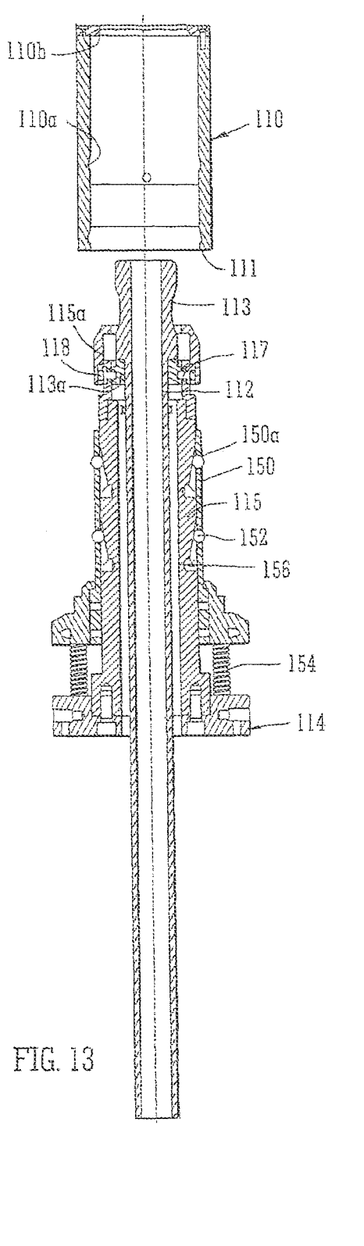
FIG. 13 is a cross-sectional view of the schematic diagram of FIG. 12.

The mechanism by which the locking dogs 117 move from their inner locking position to their outer release position will now be described in relation to FIGS. 12-17. FIGS. 12 and 13 show the bend stiffener 114 connected to the riser 112 prior to insertion into the tubular fixed structure 110. The male part 115 of the bend stiffener 114 comprises a nose cone 115a connected to the remainder of the male part 115 by springs 115b (see FIGS. 8-11) such that the nose cone 115a is axially moveable with respect to the remainder of the male part 115. In particular, the nose cone 115a is axially moveable between an extended position in which the springs 115b are substantially relaxed, to a compressed position in which the springs 115b are compressed. In FIGS. 12 and 13, the nose cone 115a is in its extended position and the locking dogs 117 are in their inner locking position and are circumferentially surrounded by the latch ring 118.

An outer surface of the male part 115 of the bend stiffener 114 comprises a plurality of ramped surfaces 156 and is surrounded by a tubular cage 150 having apertures 150a therein. Balls 152 are captively retained in the apertures of the cage 150 and are in radial alignment with the ramped surfaces 156 of the male part 115. The cage 150 is biased axially upwards with respect to the bend stiffener 114 by springs 154 connecting the cage 150 to the bend stiffener 114. In the position shown in FIGS. 12 and 13, where the bend stiffener 114 and riser 112 are not inserted in the tubular fixed structure 110, the axial position of the cage 150 is entirely determined by the springs 154 since no other external forces are acting thereon. In this position, the balls 152 are held in the apertures 150a in radial alignment with a top shallow end of ramped surfaces 156 such that the balls 152 protrude radially from the apertures beyond the cage 150 itself. In alternative embodiments, other forms of rollers may be used in place of the balls 152.

Figure 14A:
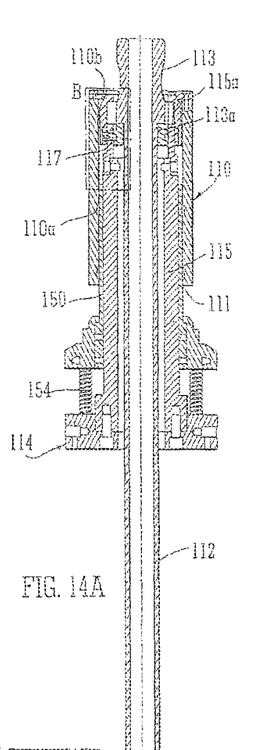
FIG. 14A is a cross-sectional view of the riser and bend stiffener after insertion into the tubular fixed structure.

The riser 112 and bend stiffener 114 may be drawn up into a tubular female receptor 111 of the tubular fixed structure 110 using the pull-in head 113. FIG. 14A shows the bend stiffener 114 and riser 112 inserted into the tubular fixed structure 110. In FIG. 14A, the nose cone 115 a has reached an inwardly projecting shoulder 110 b of the tubular fixed structure whilst the pull-in head has protruded through the upper end of the tubular fixed structure. The inwardly projecting shoulder 110 b may have a conical profile that is complementary to the shape of the nose cone 115 a so that the nose cone 115 a is able to slide up against the projecting shoulder 110 b forming a close fit.

Figure 14B:
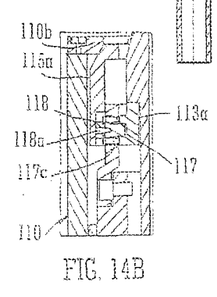
FIG. 14B is a detailed cross-sectional view of detail B of FIG. 14A.
Figure 15A:
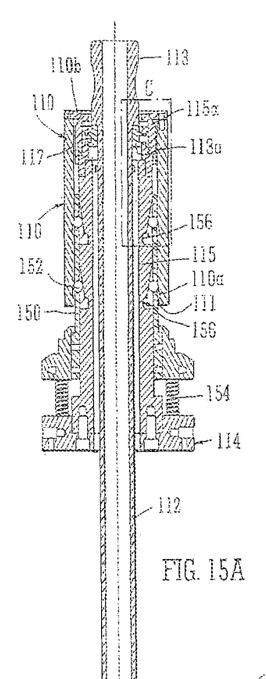
FIG. 15A is a cross-sectional view of the riser and bend stiffener disposed in the tubular fixed structure with the nose cone in its compressed position.
Figure 15B:
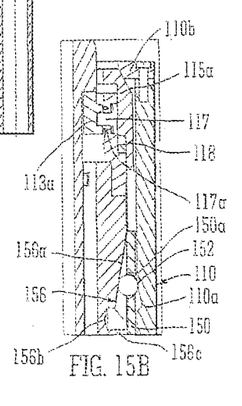
FIG. 15B is a detailed cross-sectional view of detail C of FIG. 15A.

FIG. 14B shows a detailed view of the latch ring 118 and locking dog 117 arrangement corresponding to the position shown in FIG. 14A. In particular, the locking dogs are in their locking position and are engaged with the pull-in adaptor 113 a of the riser 112. Axial interference between the locking dogs 117 and the pull-in adaptor prevent relative axial movement between the bend stiffener and riser 112. The springs 117c of the locking dogs 117 are compressed and the latch ring 118 is radially aligned with the locking dogs 117 with the shear pin 118 *a* in tact. In the embodiment shown in the pictures the nose cone 115 *a* (in its extended position) surrounds the latch ring 118 and locking dogs 117 when the locking dogs 117 are in their locking position. This arrangement may have the advantage of protecting the latch ring 118 and locking dogs 117 thereby minimising the risk of the locking dogs 117 accidentally moving to their release position and separating the riser 112 from the bend stiffener 114.

Continued upward axial movement of the bend stiffener 114 and riser 112 inside the tubular fixed structure 110 causes the nose cone 115 *a* to move to its compressed state and move axially downwardly with respect to the remainder of the male part 115. As shown more clearly in FIG. 1B, the downwardly moving nose cone 115 *a* abuts the latch ring 118 and slides it axially downwardly out of radial alignment with the locking dogs 117. At this point, it is the nose cone 115 *a* that holds the locking dogs 117 in their locking position against the radially outward bias of springs 117 *c*.

As the riser 112 and bend stiffener 114 are drawn together into the tubular fixed structure 110, the balls 152 ride along an inner surface of the tubular fixed structure 110. When contact is made between the balls 152 and inner surface of the tubular fixed structure, the balls are deflected radially inwardly which force them to move down the ramped surfaces 156. This causes the cage 150 to also move axially downward relative to the male part 115 and compresses springs 154. In moving upwards within the tubular fixed structure 110, the balls 152 ride over a plurality of circumferential grooves 110*a* of the tubular fixed structure 152 inner surface. The grooves 110*a* have a ramped profile in an axial cross section where the grooves 110*a* are inclined such that they do not inhibit the upward axial movement of the balls 152, but do not allow the balls 152 to pass axially downwardly (described in more detail below). In the position shown in FIGS. 15A and 15B where the bend stiffener 114 and riser 112 have been fully inserted into the tubular fixed structure so that the nose cone 115*a* is in its compressed state, the balls 152 are wedged between the ramped surfaces 156 of the male part 115 and an upper part of the grooves 110*a* of the tubular fixed structure.

Figures 16A, 16B, 17:
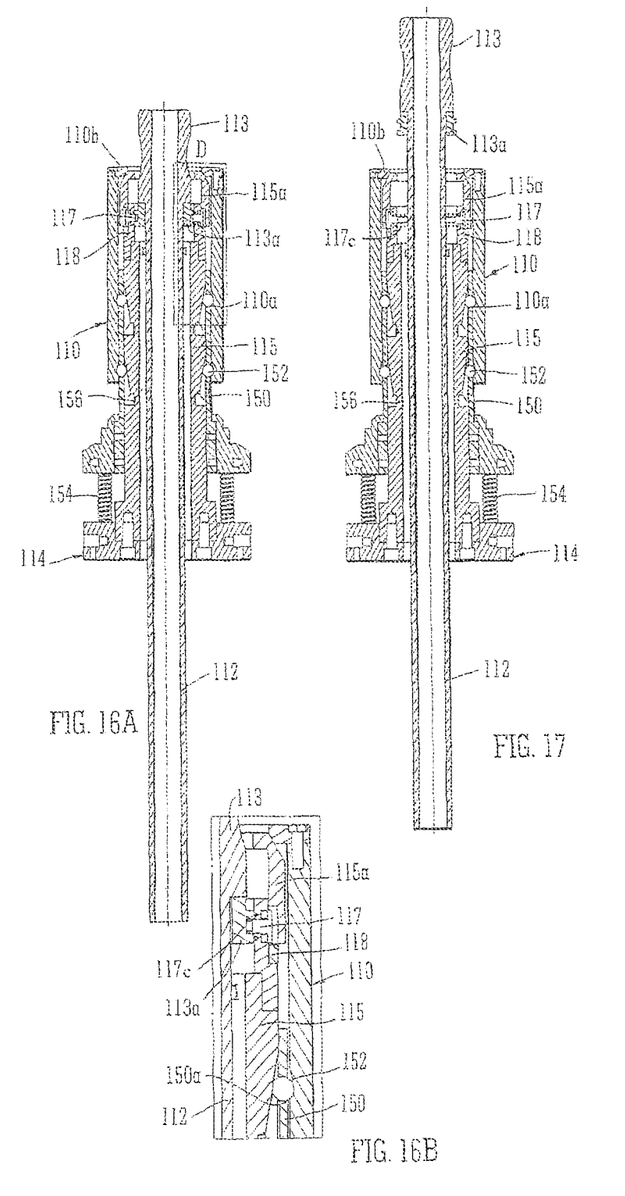
FIG. 16A is a cross-sectional view of the riser and bend stiffener disposed in the tubular fixed structure with the nose cone in its extended position and the locking dogs in their release position.
FIG. 16B is a detailed cross-sectional view of detail D of FIG. 16A.
FIG. 17 is a cross sectional view of the bend stiffener held within the tubular fixed structure and the riser moving freely moving axially upwards relative thereto.

When the load that was previously being used to draw the riser 112 and bend stiffener 114 is released, the nose cone 115 *a* relaxes under the bias of its springs 115 *b* to its extended state, moving axially upwards relative to the remainder of the male part 115. In practice, the nose cone 115 *a* will remain stationary in contact with inwardly projecting shoulder 110 *b* and the male part 115 will move axially downwards relative to the nose cone 115 *a*. FIGS. 16A and 16B show the system following the removal of the upward load on the pull-in head 113 where the nose cone 115 *a* is in its extended position relative to the remainder of the male part 115. In the extended position, the nose cone 115 *a* does not inhibit the radial movement of the locking dogs 117 and allows them to move to their release position. FIG. 16B shows a detailed view of the locking dogs 117 in their release position and the nose cone 115 *a* in its extended position.

The skilled person will appreciate that the movement of the nose cone 115*a* from its compressed position (FIGS. 15A and 15B) to its extended position (FIGS. 16A and 16B) is only possible, within the tubular fixed structure, due to the presence and profile of the grooves 110*a*. The grooves 110*a* provide a recess into which the balls 152 may move downwardly into so that the male part 115 can move axially downwards relative to the tubular fixed structure 110. The grooves 110*a* therefore provide "take-up" for the bend stiffener 114, allowing it to move axially downwardly by a limited amount. Indeed, once the locking dogs 117 have moved to their release position, the bend stiffener 114 is effectively separated from the riser 112 and so is no longer supported by the load (if present) holding the riser 112. Therefore, once the locking dogs 117 have moved to their release position, the bend stiffener 114 is free to move axially downwards within the tubular fixed structure 110 under the influence of gravity. However, downward axial movement of the bend stiffener 114 within the tubular fixed structure 110 is arrested when the balls 152 locate in grooves 110*a*. FIGS. 16A and 16B show the bend stiffener 114 supported within the tubular fixed structure 110. As shown, the balls 152 are wedged between the grooves 110*a* and ramped surfaces 156 with the springs 154 biasing the cage 150 axially upwards no longer in compression. In this position, the weight of the bend stiffener 114 is transferred to the tubular fixed structure 110 via the balls 152 and the bend stiffener 114 is prevented from moving axially downwards and separating from the tubular fixed structure 110.

FIG. 17 shows the riser 112, now disconnected from the bend stiffener 114, travelling axially upwardly with respect to the bend stiffener 114 which is held within the tubular fixed structure 110. The riser 112 may then be connected to a vessel or fixed surface platform or the like as required.

Figure 18A:
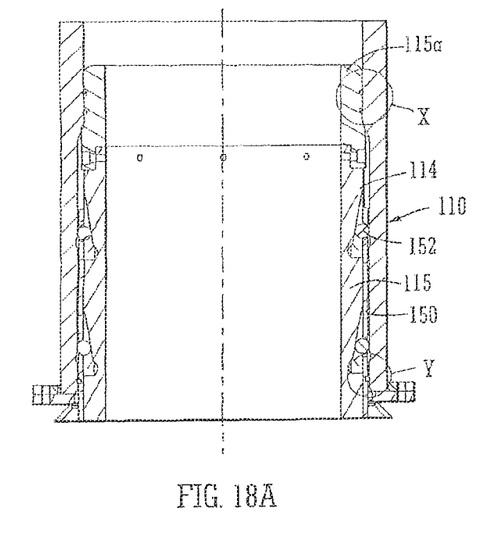
FIG. 18A is a cross-sectional view showing seals that define a sealed annulus between the tubular fixed structure and the bend stiffener with the bend stiffener disposed within the tubular fixed structure.
Figure 18B:
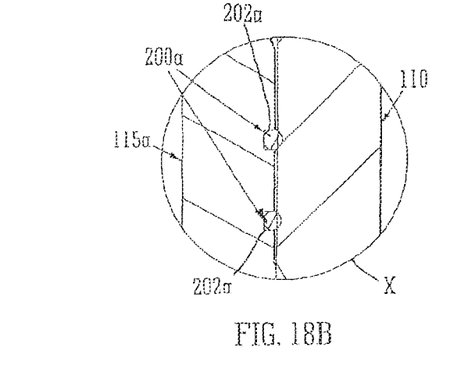
FIG. 18B is a magnified view of detail X of FIG. 18A.
Figure 18C:
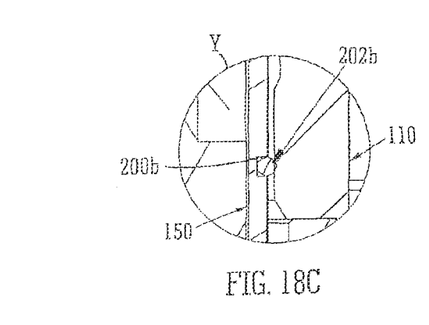
FIG. 18C is a magnified view of detail Y of FIG. 18A.

In the preferred embodiment shown in FIGS. 18A-18C, the bend stiffener 114 forms a sealed connection with the tubular fixed structure 110 once the bend stiffener 114 is held within therein.

FIG. 18A shows a cross-sectional view of the bend stiffener 114 held within the tubular fixed structure 110 by the action of the balls 152, grooves 110*a* and ramped surfaces 156. The nose cone 115*a* of the male part 115 is provided with a plurality of upper annular grooves 202*a* as shown in the magnified portion X in FIG. 18B. In each upper annular groove 202*a* is disposed an upper o-ring seal 200*a* that circumvents the nose cone 115*a*. Each upper o-ring seal 200*a* has a thickness that is greater than the depth of the upper annular grooves 202*a* such that when disposed in the upper annular grooves 200*a*, the upper o-ring seals 200*a* protrude radially beyond the outer surface of the nose cone 115*a*. However, the diameters of the upper o-ring seals 200*a* are such that the upper o-ring seals 200*a* are retained in the upper annular grooves 202*a* in the absence of any external forces acting on the upper o-ring seals 200*a*.

Axially below the nose cone 115*a* and the balls 152, the male part 115 is provided with a lower annular groove 202*b* as shown in the magnified portion Y in FIG. 18C. The lower annular groove 202*b* contains a lower o-ring seal 200*b* that circumvents the male part 115 and has a thickness that is greater than the radial depth of the lower annular groove 202*b*. The lower o-ring seal 200*b* is therefore retained in the lower annular groove 202*b* but protrudes radially beyond the outer surface of the male part 115 in the absence of any external forces acting on the lower o-ring seal 200*b*.

When the riser 112 and bend stiffener 114 are drawn into the tubular fixed structure 110, the upper o-ring seals 200*a* are compressed between the nose cone 115*a* and the inner surface of the tubular fixed structure 110. Similarly, the lower o-ring seal 200*b* is compressed between the male part 115 and the inner surface of the tubular fixed structure 110. Therefore, when the bend stiffener 114 moves to the position where it is supported by the tubular fixed structure 110 (as described above in relation to FIGS. 16A and 16B), the upper and lower o-ring seals 200*a*, 200*b* establish a sealed annulus between the bend stiffener 114 and the tubular fixed structure 110. The sealed annulus seals the arrangements of balls 152, grooves 110*a* and ramped surfaces 156 from seawater, chemicals or particles that may cause erosion or corrosion and compromise the ability of the bend stiffener 114 to be retained within the tubular fixed structure 110.

Although the invention is described above in the context of a system comprising a riser, a bend stiffener and a tubular fixed structure, the skilled person will appreciate that the principles of the invention may be exploited in use with any suitably flexible member where the flexible member has a sleeve surrounding it in the region where it attaches to the tubular fixed structure. The present invention is therefore not limited to exclusive use with risers and bend stiffeners.

The invention claimed is:

1. A system for introducing upwardly a flexible member into a tubular fixed structure with a sleeve surrounding the flexible member in a region where the flexible member attaches to the tubular fixed structure, the system enabling the flexible member to be drawn upwardly into a bore of the tubular fixed structure, said bore being defined by an inner surface of said tubular structure, the system comprising:
    a plurality of locking dogs attached to and radially moveable with respect to the sleeve between an inner locking position in which they are engaged with the flexible member and temporarily clamp together the sleeve and the flexible member, and an outer release position in which they are disengaged from the flexible member,
    a latch ring disposed on a substantially cylindrical surface so that it may be deflected axially along said surface on contact between the sleeve and tubular fixed structure to permit release of said locking dogs when the sleeve attains a fixed disposition with respect to the tubular fixed structure, such as to permit continued movement of the flexible member with respect to the sleeve;
    wherein said sleeve comprises a main body and a nose cone, said nose cone being axially moveable from an extended position to a compressed position relative to said main body; and
    wherein a rim of said nose cone is in axial alignment with said latch ring so that when said nose cone moves from said extended position to said compressed position said rim abuts said ring and moves it axially out of radial alignment with said locking dogs.

2. The system according to claim 1, wherein, in said inner locking position, the locking dogs are engaged with a slot in said flexible member so that the locking dogs are in axial alignment with a portion of the flexible member both axially above and below the locking dogs to clamp the sleeve and flexible member together, and
    in said outer release position the locking dogs are not engaged with the slot so that continued movement of the flexible member with respect to the sleeve is permitted.

3. The system according to claim 2, wherein, in said inner locking position, said latch ring is in radial alignment with and circumferentially surrounds said locking dogs to prevent said locking dogs from moving radially outwards out of engagement with said slot, and in said outer release position said latch ring is not in radial alignment with said locking dogs so as to allow said locking dogs to move radially outwards out of engagement with said slot.

4. The system according to claim 1, wherein said locking dogs are radially biased towards said outer release position.

5. The system according to claim 1, wherein said cylindrical surface comprises an outer surface of the sleeve through which radial apertures are formed to receive said locking dogs, and outer surfaces of said locking dogs.

6. The system according to claim 1, wherein said nose cone is separated from said main body by a plurality of springs, said plurality of springs also biasing said nose cone to said extended position.

7. The system according to claim 1, wherein said tubular fixed structure comprises a shoulder portion projecting radially inward from said inner surface of said tubular fixed structure, said shoulder portion having a smallest diameter that is less than a largest diameter of said nose cone and greater than a largest diameter of said flexible member.

8. The system according to claim 7, wherein said shoulder portion has a conical profile that is complementary to a top portion of said nose cone.

9. The system according to claim 1, wherein said sleeve comprises a plurality of ramped surfaces thereon, a tubular cage surrounding said sleeve, a plurality of rolling members each captively retained within apertures of the tubular cage, said tubular cage being axially moveable and biased axially upwardly with respect to the sleeve, said rolling members being capable of gripping said tubular fixed structure by wedging between said ramped surfaces and said inner surface of said tubular fixed structure.

10. The system according to claim 9, wherein said inner surface of said tubular fixed structure comprises circumferential grooves having a ramped profile in an axial cross section whereby the inclination of the ramped grooves is such that said rolling members are able to move axially up the grooves but are inhibited from moving axially downwards beyond said grooves.

11. The system according to claim 9, wherein said rolling members are balls.

12. The system according to claim 9, wherein said tubular cage is biased axially upwardly with respect to said sleeve by springs attached to said tubular cage and said sleeve.

13. The system according to claim 9, wherein said sleeve is provided with seals located both axially above and axially below said rolling members to define a seated annulus between said tubular fixed structure and said sleeve when said sleeve is disposed within said tubular fixed structure, wherein said rolling members are contained within said sealed annulus.

14. The system according to claim 13, wherein said seals comprise a plurality of o-ring seals each disposed in an annular groove in said sleeve.

15. The system according to claim 1, further comprising a collar slidably located within the tubular fixed structure and engageable with the locking dogs to move the same into engagement with the riser.

16. The system according to claim 1, wherein said latch ring is connected to said locking dogs by at least one shear pin and said at least one shear pin must be sheared so that said latch ring may be deflected axially along said surface on contact between the sleeve and tubular fixed structure to permit release of said locking dogs.

17. The system according to claim 1, wherein said sleeve is a bend stiffener.

* * * * *